US009245053B2

(12) United States Patent
Riedy et al.

(10) Patent No.: US 9,245,053 B2
(45) Date of Patent: *Jan. 26, 2016

(54) EFFICIENTLY SEARCHING AND MODIFYING A VARIABLE LENGTH QUEUE

(71) Applicant: International Business Machines Corporation, Armonk, NY (US)

(72) Inventors: Dale F. Riedy, Poughkeepsie, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/795,211

(22) Filed: Mar. 12, 2013

(65) Prior Publication Data

US 2014/0281318 A1  Sep. 18, 2014

(51) Int. Cl.
*G06F 12/00* (2006.01)
*G06F 17/30* (2006.01)
*G06F 9/46* (2006.01)
*G06F 9/52* (2006.01)

(52) U.S. Cl.
CPC .......... *G06F 17/30985* (2013.01); *G06F 9/466* (2013.01); *G06F 9/52* (2013.01); *G06F 2209/548* (2013.01)

(58) Field of Classification Search
CPC .............. G06F 9/30043; G06F 3/0659; G06F 17/30386; G06F 9/466; G06F 12/1425; G06F 17/30985
See application file for complete search history.

(56) References Cited

U.S. PATENT DOCUMENTS

| 5,555,396 | A  | * | 9/1996  | Alferness et al. ............. 711/147 |
| 6,275,823 | B1 |   | 8/2001  | Ronstrom |
| 6,868,414 | B2 |   | 3/2005  | Khanna et al. |
| 7,107,367 | B1 |   | 9/2006  | Hughes |
| 8,078,820 | B2 |   | 12/2011 | Michaylov et al. |
| 2007/0260777 | A1 | * | 11/2007 | Timpe et al. .................... 710/52 |

OTHER PUBLICATIONS

Giacomoni et al, "FastForward for Efficient Pipeline Parallelism: A Cache-Optimized Concurrent Lock-Free Queue", PPoPP'08, ACM, pp. 43-52, 2008.

(Continued)

*Primary Examiner* — Reginald Bragdon
*Assistant Examiner* — Thanh D Vo
(74) *Attorney, Agent, or Firm* — Cantor Colburn LLP; William A. Kinnaman, Jr.

(57) ABSTRACT

A system for ensuring that serialization is maintained between separate transactions while searching and/or modifying a variable length queue is system includes a computer processor and logic executable by the computer processor. The logic is configured to implement a method. The method includes searching, by a processing device, a queue using a transaction. A first sequence number is retrieved from a queue header and a second sequence number is retrieved from local storage for the transaction. The first sequence number is compared with the second sequence number according to embodiments. The search of the queue is resumed using an address of a next element saved from a previous transaction responsive to the first sequence number matching the second sequence number. The search of the queue is restarted at a first element responsive to the first sequence number not matching the second sequence number.

10 Claims, 3 Drawing Sheets

(56) References Cited

OTHER PUBLICATIONS

Hudson et al, "McRT-Malloc—A Scalable Transactional Memory Allocator", ISMM'06, Proc. of the 5th International Symposium on Memory Management, ACM, pp. 74-83, 2006.

Greiner, "IBM zEnterprise EC12 CPU Facilities", IBM z/Server Architecture, Share 120, Session 12670, Feb. 5, 2013, pp. 1-62.

* cited by examiner

EFFICIENTLY SEARCHING AND MODIFYING A VARIABLE LENGTH QUEUE

BACKGROUND

The present invention relates generally to the serialization of queues in a multi-processor environment, and more specifically, to ensuring that serialization is maintained between separate transactions while searching and/or modifying a variable length queue.

Searching and/or modifying a queue in a multi-processor environment generally requires a serialization mechanism to ensure that one central processing unit (CPU) is not making incompatible changes to the queue while another CPU is either searching the queue or also making changes to the queue.

One conventional serialization mechanism is a hardware or software locking technique, which permits a single CPU to update the queue or multiple CPUs to search the queue without updating. Another conventional serial mechanism utilizes transactional execution. A typical transactional execution implementation allows a set of instructions that search or modify a queue to appear as a single transaction with respect to other CPUs. That is, all storage accesses between the start and end of the transaction appear to be block-concurrent with respect to other CPUs, and all storage updates are either committed in their entirety once the transaction ends or none of them are committed due to a fetch or store conflict with another CPU. If a conflict occurs between two CPUs (e.g., one CPU accesses a storage area that is modified by another), the transaction is aborted for one or both CPUs. The transaction can then be retried by the CPUs.

SUMMARY

According to an embodiment of the present invention, a method for ensuring that serialization is maintained between separate transactions while searching and/or modifying a variable length queue is provided. The method includes searching, by a processing device, a queue using a transaction. A first sequence number is retrieved from a queue header and a second sequence number is retrieved from local storage for the transaction. The first sequence number is compared with the second sequence number according to embodiments. The search of the queue is resumed using an address of a next element saved from a previous transaction responsive to the first sequence number matching the second sequence number. The search of the queue is restarted at a first element responsive to the first sequence number not matching the second sequence number.

According to an embodiment of the present invention, a system for ensuring that serialization is maintained between separate transactions while searching and/or modifying a variable length queue is provided. The system includes a computer processor and logic executable by the computer processor. The logic is configured to implement a method. The method includes searching, by a processing device, a queue using a transaction. A first sequence number is retrieved from a queue header and a second sequence number is retrieved from local storage for the transaction. The first sequence number is compared with the second sequence number according to embodiments. The search of the queue is resumed using an address of a next element saved from a previous transaction responsive to the first sequence number matching the second sequence number. The search of the queue is restarted at a first element responsive to the first sequence number not matching the second sequence number.

According to a further embodiment of the present invention, a computer program product for ensuring that serialization is maintained between separate transactions while searching and/or modifying a variable length queue is provided. The computer program product includes a storage medium having computer-readable program code embodied thereon, which when executed by a computer processor, causes the computer processor to implement a method. The method includes searching, by a processing device, a queue using a transaction. A first sequence number is retrieved from a queue header and a second sequence number is retrieved from local storage for the transaction. The first sequence number is compared with the second sequence number according to embodiments. The search of the queue is resumed using an address of a next element saved from a previous transaction responsive to the first sequence number matching the second sequence number. The search of the queue is restarted at a first element responsive to the first sequence number not matching the second sequence number.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
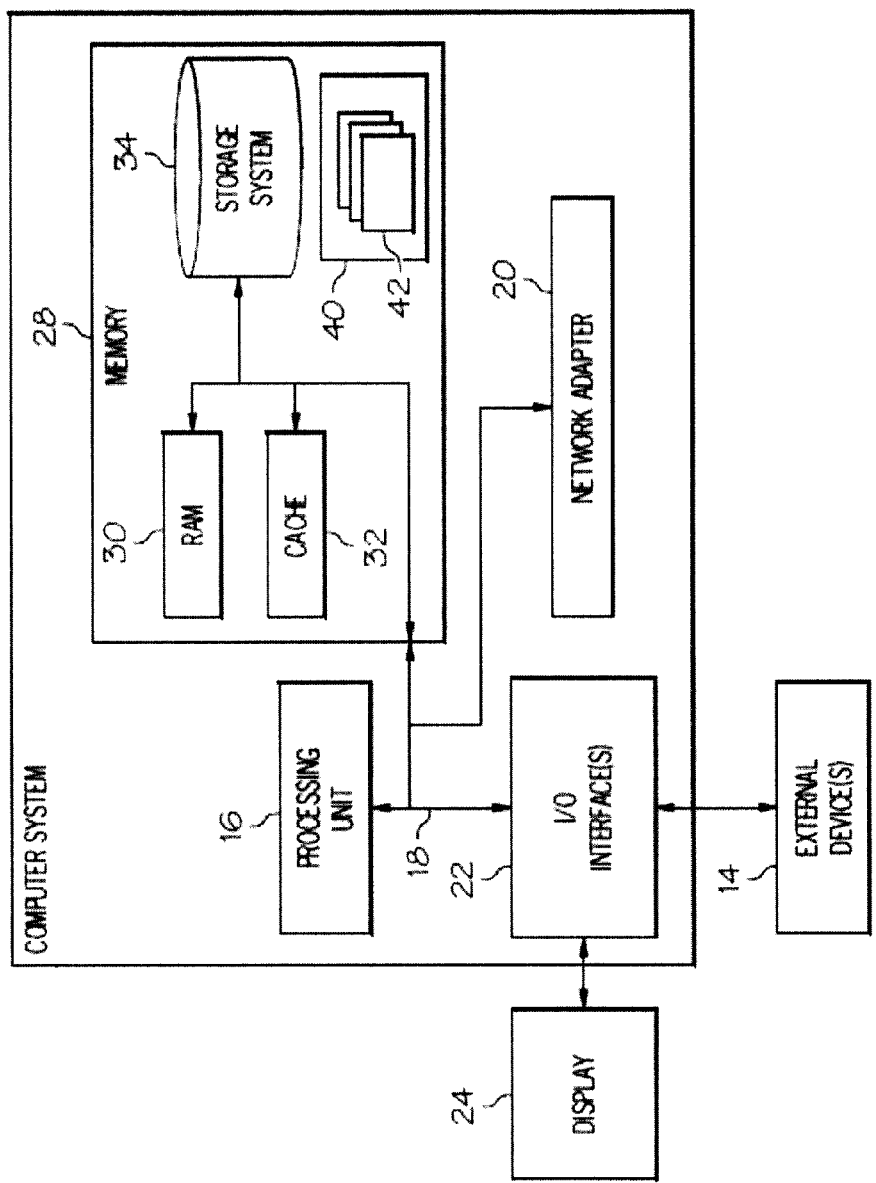
FIG. 1 depicts a block diagram of a computer system according to an embodiment.

Embodiments disclosed herein are directed to a method providing transactional execution to search and/or modify a variable length queue such that the number of elements searched does not cause the maximum number of storage references to be exceeded and the transaction to be aborted, and ensures serialization is maintained between separate transactions. Embodiments disclosed herein may provide a hardware or software lock as a backup if the transaction aborts and cannot be retried and ensures that all transactions are aborted if another CPU obtains a lock for serialization.

Searching and modifying a queue in a multi-processor environment generally requires a serialization mechanism to ensure that one central processing unit (CPU) is not making incompatible changes to the queue while another CPU is either searching the queue or also making changes to the queue. In typical multi-processing environments, serialization may be accomplished by a hardware or software locking technique, which permits a single CPU to update the queue or multiple CPUs to search the queue without updating. This technique typically serializes a much broader resource that what is necessary. For example, if a queue consists of 1000 elements, and one CPU needs to add an element between the 999th and 1000th elements, and a second CPU needs to search the queue for a matching element that appears before the 999th element, then the second CPU must still wait even though it is not affected by the changes made by the first CPU. Finer grained serialization such as using multiple locks may be used, however, multiple locks may have hierarchy or deadlock issues and may not lend itself easily to the way the queue is being accessed.

Transactional execution allows the set of instructions that search or modify a queue to appear as a single transaction with respect to other CPUs. That is, all storage accesses between the start and end of the transaction appear to be block-concurrent with respect to other CPUs, and all storage updates are either committed in their entirety once the transaction ends, or none of them are committed due to fetch or store conflict with another CPU. If a conflict occurs between two CPUs (e.g., one CPU accesses a storage area that is modified by another), the transaction is aborted for one or both CPUs. The transaction may then be retried by the CPUs. However, even with transactional execution, there are limitations on the number of unique storage references and updates (e.g., cache lines) that can occur within a transaction, and limitations on the type or number of instructions that may be executed. For example, a program may need to find and remove two elements from the queue. After each element is removed, some additional processing needs to be performed, such as freeing the element or giving control to another routine. If this additional processing cannot be done under a transaction, then the program has no choice but to end the transaction after finding the first element and then start a new transaction for the second element. Since there is no serialization between the transactions, the program has no choice but to search the queue starting with the first element. If the queue is very long, this can be very time consuming, especially if storage areas for the elements are no longer in the CPU cache and have to be fetched from memory. Additionally, if there are limitations on the number of unique storage references in a transaction, the program cannot simply search through the entire queue until it finds the matching element because the transaction would abort long before the element is found.

Embodiments disclosed herein provide a method, system, and computer program product for maintaining serialization between separate transactions. A new transaction may resume a search of a queue according to embodiments. The new transaction retrieves a first sequence number from a queue header a second sequence number for the transaction from local storage. The first sequence number is compared with the second sequence number according to embodiments. Responsive to the first sequence number matching the second sequence number, the search of the queue is resumed using an address of a next element saved from a previous transaction. However, responsive to the first sequence number not matching the second sequence number, a search of the queue is restarted at a first element of the queue.

Referring now to FIG. 1, a block diagram of a computer system 10 suitable for searching and modifying a variable length queue without locks according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device, also referred to as a processing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
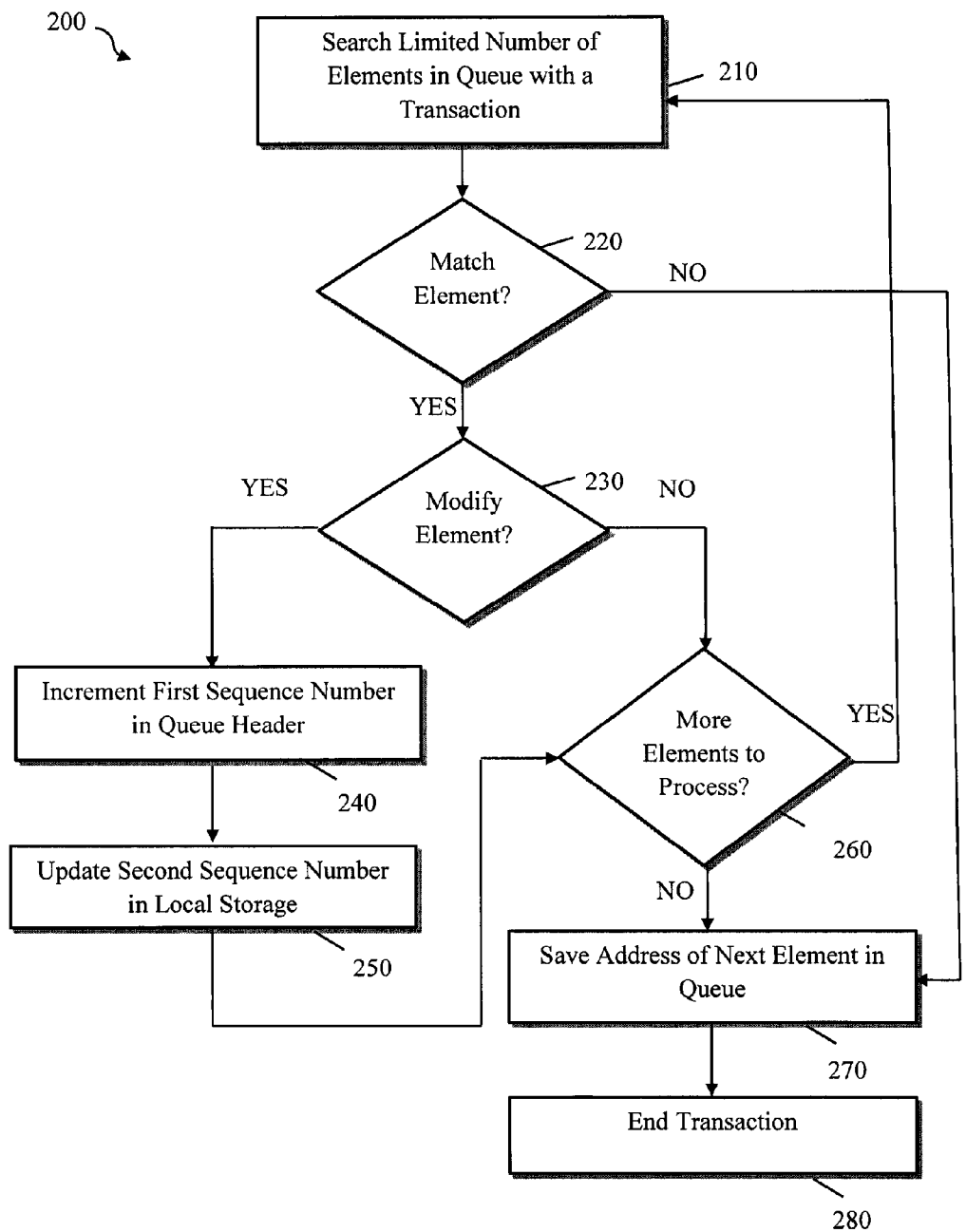
FIG. 2 depicts a flow diagram of a process for searching and modifying a variable length queue with a transaction according to an embodiment.

With reference to FIG. 2, a process 200 for searching and modifying a variable length queue with a transaction according to an embodiment is generally shown. According to an embodiment the process 200 may be implemented with a processing unit 16 of computer system 10 shown in FIG. 1.

According to an embodiment, a queue header control block of an embodiment has a pointer to a first element of the queue. The queue header control block may be stored in system memory according to an embodiment. The queue header control block may be at a fixed location in memory or may be found by traversing a set of control blocks according to an embodiment. The queue header control block contains the first sequence number, which is incremented any time an element in the queue is added, deleted or modified. The first sequence number is updated under a serialization of the transaction or as a backup, a lock.

Before starting the first transaction to search the queue, a second sequence number variable in a local storage of the processing unit 16 is set to zero. Because the second sequence number is zero, the current sequence number from the queue header is obtained and the search of the queue begins with the first element in the queue, as shown in block 210. According to an embodiment, by referencing the first sequence number in the queue header within the transaction, the current processing unit 16 is registering interest in the storage area used for the first sequence number. Therefore, if another processing unit successfully adds, removes, or modifies an element from the queue, it will increment the sequence number and cause the current processing unit's transaction to abort.

As shown in block 210, a limited number of elements on the queue are searched for a matching element to add, remove, or modify according to an embodiment. According to another embodiment, the queue may be searched to copy an element or simply to checking whether a matching element exists. The number of storage areas that can be referenced within the transaction is limited, so a fixed number of elements will be searched before the transaction is ended (e.g., 100 elements). At block 220, the process 200 determines whether a matching element has been found during the transaction.

Responsive to finding a matching element at block 220, the process 200 determines whether the matching element on the queue has been added, removed, or modified, as shown in block 230. If the matching element on the queue was added, removed, or modified, the first sequence number in the queue header is incremented, as shown in block 240. According to an embodiment, the modified first sequence number in the queue header is also copied as the second sequence number variable in the local storage of the current processing unit, as shown in block 250. Therefore, the second sequence number in local storage will be updated when the transaction ends as discussed further below.

At block 260, a determination is made as to whether the transaction has more elements to be processed. Responsive to the transaction having more elements to process, the transaction may continue to find additional elements to examine, modify, or delete in the same transaction, as shown in block 210. This is possible as long as the maximum number of storage references for the transaction is not exceeded and the transaction does not use instructions not supported under transactional execution. In other words, the transaction may continue searching the queue for additional elements if the limited number of elements referenced in block 210 has not been exceeded. However, responsive to the transaction exceeding the limited number of elements referenced in block 210 to process, the address of the next element is saved in local storage according to an embodiment, as shown in block 270. At block 280, the transaction is ended, which commits all storage updates including any changes to the queue header, the local storage sequence numbers, and the local address of the next element according to an embodiment.

Responsive to not finding a matching element within the limited number of elements at block 220, the address of the next element is saved in local storage according to an embodiment, as shown in block 270. Accordingly, the transaction is ended, which commits all storage updates including any changes to the queue header, the local storage sequence numbers, and the local address of the next element according to an embodiment, as shown in block 280.

Responsive to not modifying the matching element at block 230, a determination is made at block 260 as to whether there are more elements to process in the transaction. If the limited number of elements referenced in block 210 has not been exceeded, the transaction will continue to find additional elements to examine, modify, or delete in the same transaction, as shown in block 210. However, responsive to a determination that the limited number of elements referenced in block 210 has been exceeded at block 260, the address of the next element is saved in local storage according to an embodiment, as shown in block 270. Accordingly, the transaction is ended, which commits all storage updates including any changes to the queue header, the local storage sequence numbers, and the local address of the next element according to an embodiment, as shown in block 280.

Figure 3:
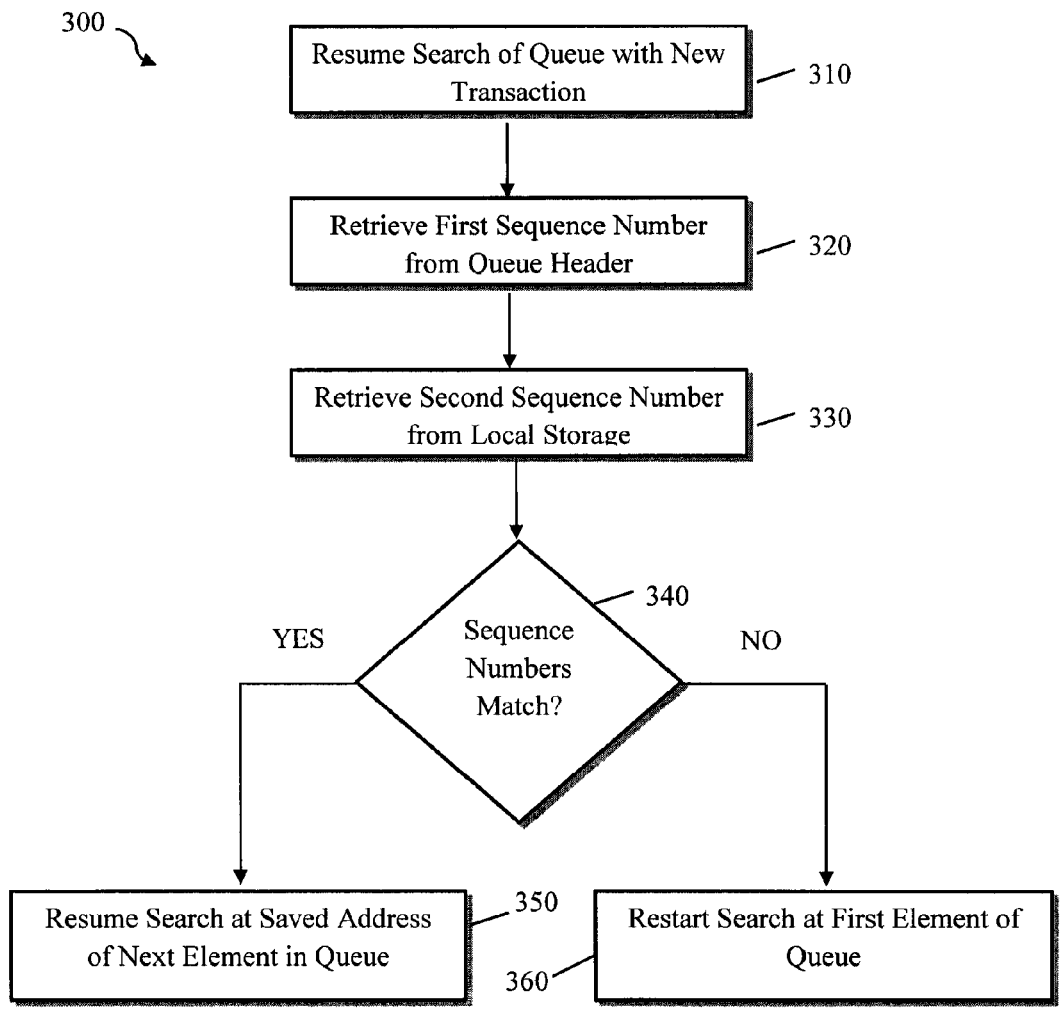
FIG. 3 depicts a flow diagram a process for resuming the searching and modifying of a variable length queue with a new transaction according to an embodiment.

With reference to FIG. 3, a process 300 for resuming the searching and modifying of a variable length queue with a new transaction according to an embodiment is generally shown. According to an embodiment the process 300 may be implemented with a processing unit 16 of computer system 10 shown in FIG. 1.

At block 310, a search for a matching element within a queue is resumed using a new transaction. The first sequence number is retrieved from the queue header, as shown in block 320, and the second sequence number is retrieved from local storage, as shown in block 330. According to an embodiment, the second sequence number in local storage is compared against the first sequence number in the queue header to determine whether they match, as shown in block 340. If the sequence numbers match, then an embodiment will resume searching the queue with the address of the next element saved during the previous transaction, as shown in block 350. If another processing unit has modified the queue while the current processing unit 16 was outside of the transaction, the sequence number will be different, and an embodiment will resume the search starting with the first element, as shown in block 360.

According to an embodiment, if any other processing unit modifies the queue during the current transaction, then the current transaction will abort for the processing unit 16. If a transaction of an embodiment aborts and is retryable, the maximum number of elements that may be searched at a time may be reduced down to a lower limit and the transaction may be retried a limited number of times according to an embodiment. For example, a transaction of an embodiment may start by searching 100 elements and be reduced by 10 each time the transaction aborts down to a lower limit of 50. Reducing the number of elements searched may increase the likelihood of the transaction completing successfully since it will reduce the interference by other processing units if there are fetch or store conflicts.

Reducing the number of elements searched by a single transaction may also be beneficial when the transaction aborts due to a fetch or store overflow condition, meaning the maximum number of storage references or updates has been exceeded. This condition may be unpredictable in nature and is dependent on the particular processing unit hardware implementation. For example, suppose a processing unit supports up to 200 cache line references in a transaction, but in certain cases the transaction may abort with an overflow condition when only 100 cache lines are referenced. This may occur when a processing unit assigns cache lines to a congruence class (e.g., a hash bucket) for quick look up. Therefore, multiple cache lines may map to the same congruence class. Each congruence class may hold a maximum number of cache lines. If a new cache line needs to be fetched, and the congruence class is full, normally an old cache line is cast out to make room. However, for a transactional execution, since all cache lines need to be tracked in order to complete the transaction, a cast out will cause the transaction to abort. Therefore, the number of elements that may be traversed before the transaction abort is variable and unpredictable according to an embodiment.

According to an embodiment, when beginning a new queue search, the maximum number of elements searched by a transaction may be a fixed number or an adjusted number based on prior transaction attempts. For example, if the last time the queue was searched, the transaction aborted until the number of elements was reduced to 70, then subsequent searches can traverse 70 elements to avoid aborting the new transaction. This number can be increased after a period of time or after significant number of elements have been added or removed from the queue according to an embodiment.

According to an embodiment, if the transaction is aborted, a limited number of designated retries may be performed. When the number of retries is exhausted or the transaction is aborted and not retryable, a lock may be obtained to serialize the queue according to an embodiment. To ensure that all transactions accessing the queue are aborted when the lock is obtained, at the start of each transaction, the contents of the lock word are checked to see if another processing unit has obtained the lock for serialization. If so, a flag is set in local storage to indicate that the lock should be used for serialization, the transaction is ended and the search is retried after obtaining the lock according to an embodiment. If the lock is not held, the transaction continues according to an embodiment. However, by checking the contents of the lock word inside of the transaction, the current processing unit 16 is registering interest in the storage area used for the lock word. Therefore, if another processing unit obtains the lock after the current transaction has checked the lock word, the current transaction will be aborted according to an embodiment.

Technical effects and benefits of embodiments disclosed herein include providing a transactional execution to search and/or modify a variable length queue such that the number of elements searched does not cause the number of storage references to be exceeded and the transaction to be aborted, and ensuring that serialization is maintained between separate transactions. Embodiments disclosed herein may provide a hardware or software lock as a backup if the transaction aborts and cannot be retried and ensures that all transactions are aborted if another CPU obtains a lock for serialization.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system configured to maintain serialization between separate transactions, comprising:
    a memory having computer readable computer instructions; and
    a processing device for executing the computer readable instructions to perform a method comprising:
        searching a queue using a transaction;
        retrieving a first sequence number from a queue header;
        retrieving a second sequence number for the transaction;
        comparing the first sequence number with the second sequence number;
        resuming a search of the queue using an address of a next element saved from a previous transaction responsive to the first sequence number matching the second sequence number; and
        starting a search of the queue at a first element responsive to the first sequence number not matching the second sequence number,
        wherein the transaction is aborted due to a selected one of a group comprising a defined maximum number of elements searchable by the transaction is reached, the first sequence number is incremented by another processing device, a lock is acquired by another processing device, and a fetch and store overflow condition occurs,
        wherein the defined maximum number of elements searchable by the transaction is lowered each time the transaction restarts due to an abort.

2. The computer system of claim 1, wherein responsive to the transaction adding, removing, or modifying an element in the queue, the system is further configured to:
    incrementing the first sequence number;
    updating the second sequence number to match the incremented first sequence number; and
    saving an address of the next element in the queue.

3. The computer system of claim 1, wherein responsive to the transaction being a first transaction of a queue search, the method further comprises setting the second sequence number to zero before starting the first transaction of the queue search.

4. The computer system of claim 1, wherein the defined maximum number of queue elements searchable by the transaction is a fixed number or an adjusted number based on prior transaction attempts.

5. The computer system of claim 1, wherein the lock is obtained to serialize the queue in response to reaching a maximum number of transaction restarts.

6. A computer system configured to maintain serialization between separate transactions, comprising:
   a memory having computer readable computer instructions; and
   a processing device for executing the computer readable instructions to perform a method comprising:
   searching a queue using a transaction;
   retrieving a first sequence number from a queue header;
   retrieving a second sequence number for the transaction;
   comparing the first sequence number with the second sequence number;
   resuming a search of the queue using an address of a next element saved from a previous transaction responsive to the first sequence number matching the second sequence number; and
   starting a search of the queue at a first element responsive to the first sequence number not matching the second sequence number,
   wherein the transaction is aborted due to a selected one of a group comprising a defined maximum number of elements searchable by the transaction is reached, the first sequence number is incremented by another processing device, a lock is acquired by another processing device, and a fetch and store overflow condition occurs,
   wherein the lock is obtained to serialize the queue in response to reaching a maximum number of transaction restarts.

7. The computer system of claim 6, wherein responsive to the transaction adding, removing, or modifying an element in the queue, the system is further configured to:
   incrementing the first sequence number;
   updating the second sequence number to match the incremented first sequence number; and
   saving an address of the next element in the queue.

8. The computer system of claim 6, wherein responsive to the transaction being a first transaction of a queue search, the method further comprises setting the second sequence number to zero before starting the first transaction of the queue search.

9. The computer system of claim 6, wherein the defined maximum number of elements searchable by the transaction is lowered each time the transaction restarts due to an abort.

10. The computer system of claim 6, wherein the defined maximum number of queue elements searchable by the transaction is a fixed number or an adjusted number based on prior transaction attempts.

* * * * *